United States Patent
Seidler

(10) Patent No.: US 6,785,998 B2
(45) Date of Patent: Sep. 7, 2004

(54) VIBRATING FISHING ROD

(76) Inventor: Albert H. Seidler, 328 Ridgehaven Pl., Richardson, TX (US) 75080

(*) Notice: Subject to any disclaimer, the term of this patent is extended or adjusted under 35 U.S.C. 154(b) by 0 days.

(21) Appl. No.: 10/604,089

(22) Filed: Jun. 25, 2003

(65) Prior Publication Data
US 2004/0025402 A1 Feb. 12, 2004

(51) Int. Cl.[7] .......................... A01K 87/00; A01K 87/08
(52) U.S. Cl. ....................................................... 43/19.2
(58) Field of Search .......................................... 43/19.2

(56) References Cited

U.S. PATENT DOCUMENTS

| | | | | |
|---|---|---|---|---|
| 2,746,198 A | * | 5/1956 | Smith | 43/19.2 |
| 3,001,317 A | | 9/1961 | Boughton | |
| 3,789,534 A | | 2/1974 | Yankaitis | |
| 4,020,582 A | * | 5/1977 | Thelen | 43/19.2 |
| 4,051,616 A | * | 10/1977 | Mathauser | 43/17 |
| 4,084,342 A | * | 4/1978 | Philip | 43/19.2 |
| 4,349,978 A | * | 9/1982 | Philip | 43/19.2 |
| 4,700,501 A | * | 10/1987 | Bryan | 43/19.2 |
| 4,821,448 A | | 4/1989 | Lindaberry | |
| 4,864,763 A | * | 9/1989 | Peikin | 43/18.1 R |
| 5,036,616 A | | 8/1991 | Wilsey | |
| 6,363,650 B1 | | 4/2002 | Beeler | |

* cited by examiner

Primary Examiner—Charles T. Jordan
Assistant Examiner—Bret Hayes
(74) Attorney, Agent, or Firm—Daniel V. Thompson

(57) ABSTRACT

A vibrating fishing rod has a vibratory module mounted within a handle cavity of the fishing rod. The vibratory module is accessible through an end opening defined by end edges of the handle cavity. A switch is located in the fore grip, and an electric motor and eccentric weight in the vibratory module are activated in response to actuation of the switch.

4 Claims, 3 Drawing Sheets

VIBRATING FISHING ROD

BACKGROUND OF INVENTION

External fishing rod vibrators are well-known in the art. For example, U.S. Pat. No. 4,700,501 to Bryan and U.S. Pat. No. 3,789,534 to Yankaitis disclose battery-powered, elongate vibrators clamped to fishing rods. U.S. Pat. No. 3,001,317 to Boughton discloses a support for a fish pole.

Severe drawbacks of prior art fishing rod vibrators are that they are bulky, heavy, difficult to attach without damaging the rod, and awkward to actuate. Such vibrators typically have only simple on-off switches, whereas extensive research in the field has proven that lures need only be vibrated in short momentary bursts to have maximum fish attracting effect. Near-continuous operation is not only ineffective at catching fish but also quickly drains the batteries. Thus there exists a need for a fishing rod vibrator that is wholly enclosed by existing fishing rod structure, such as in the normally empty space inside the handle, with an easy to operate momentary on-off switch located near the fore grip, where the user's hand is normally placed during fishing operation.

Conventional fishing rods have a tapered, hollow rod body having a large end, with internal walls defining an elongate, tapered cavity, and with end edges defining an opening in the cavity. A handle, typically of cork, overlies a portion of the large end of the rod body, and the handle has end edges defining an open end substantially coplanar with the end edges of the rod body. An open ended, cylindrical cap overlies an extreme end of the handle, such that the cavity is sealed when the cap is fitted. Typically the cap is adhesively joined to the extreme end of the handle, and the cavity is permanently sealed in an empty state. A reel holder is fitted over the rod body adjacent an inner end of the handle, with well-known structure for removably holding a reel. The fore grip is fitted over the rod body adjacent an inner end of the reel holder.

SUMMARY OF INVENTION

The fishing rod of the present invention has a vibratory module fitted in the space within the handle of the fishing rod that is normally empty. Switching wires are routed within the handle to a pushbutton switch mounted in the fore grip.

BRIEF DESCRIPTION OF DRAWINGS

A more complete understanding of the invention and its advantages will be apparent from a review of the Detailed Description in conjunction with the following Drawings, in which.

DETAILED DESCRIPTION

Figure 1:
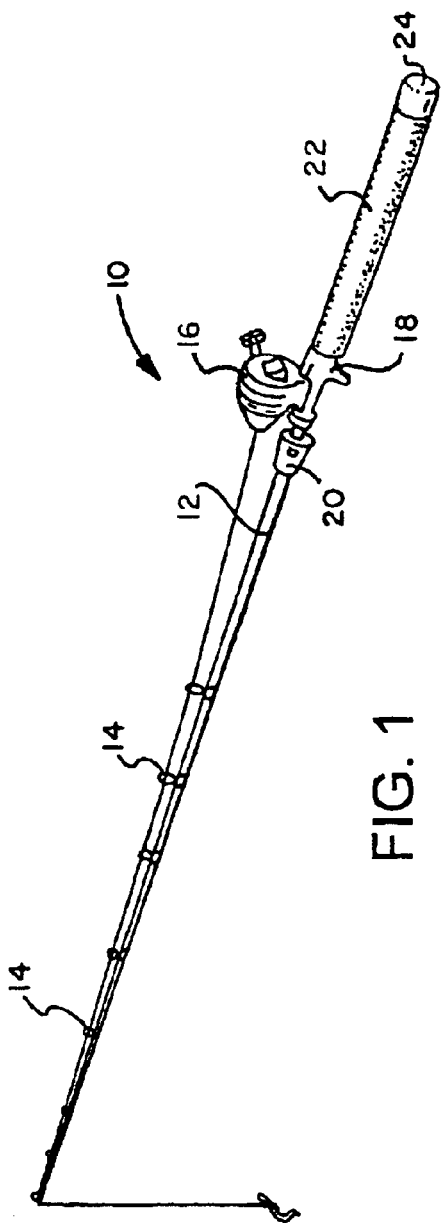
FIG. 1 is a perspective view of the apparatus of the present invention.
Figure 2:
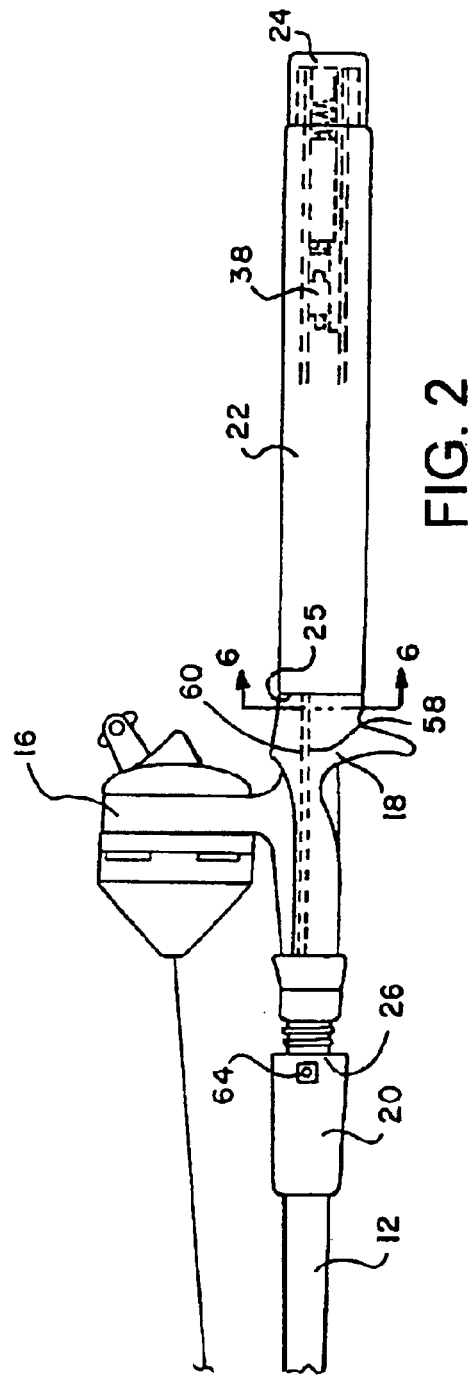
FIG. 2 is a partial side view.
Figure 3:
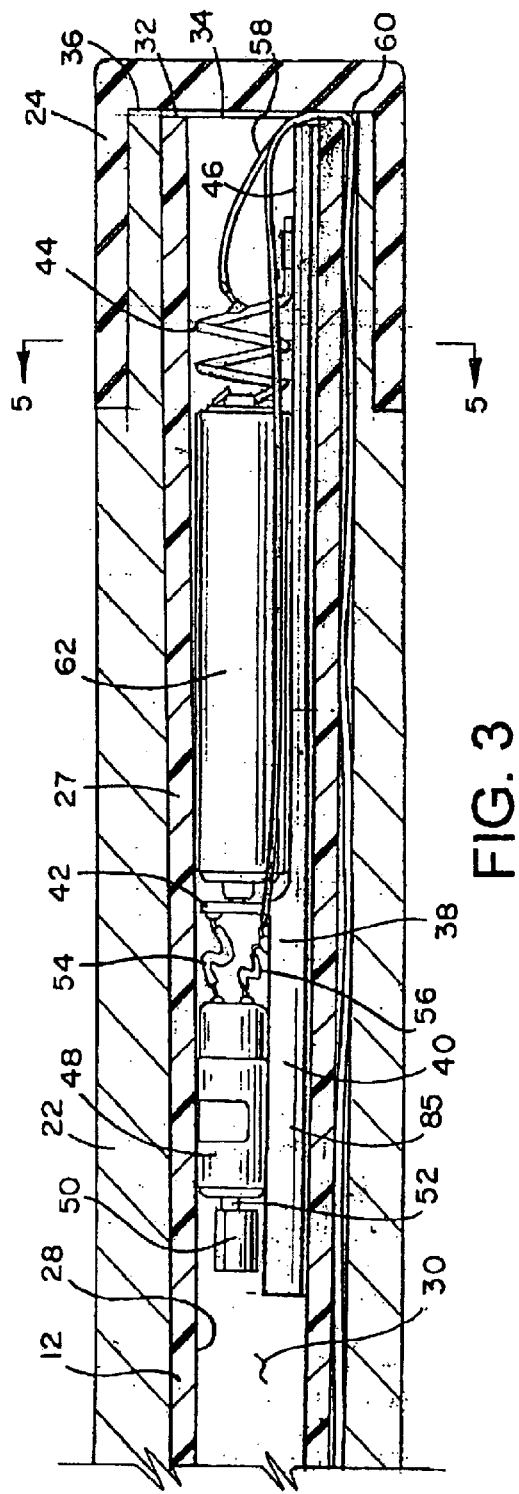
FIG. 3 is a partially broken away side view of a first embodiment of the invention.
Figure 4:
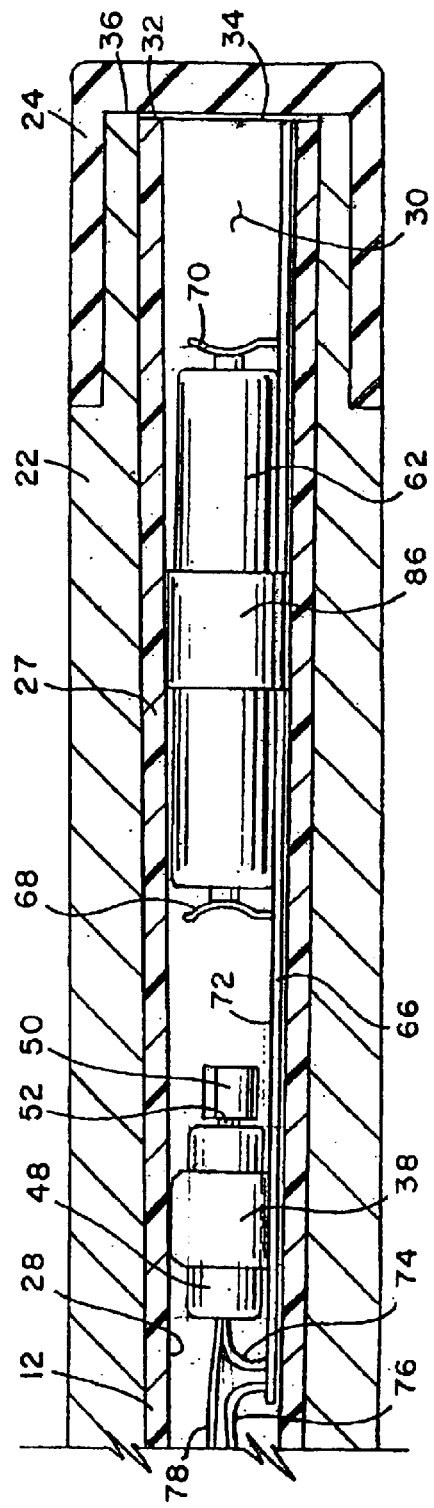
FIG. 4 is a partially broken away side view of a second embodiment of the invention.

Referring initially to FIGS. 1–7, where like numerals indicate like and corresponding elements, a vibrating fishing rod 10 includes the following conventional, prior art elements: a tapered, hollow rod body 12, guides 14, reel 16, reel holder 18, fore grip 20, handle 22 and cap 24. Reel holder 18 is fitted over the rod body 12 adjacent an inner end 25 of the handle 22. Fore grip 20 is fitted over the rod body 12 adjacent an inner end 26 of the reel holder 18. Cap 24 is open ended and cylindrical, overlying an extreme end of the handle 22. Rod body 12 has a large end 27, with an internal wall 28 defining an elongate, tapered handle cavity 30. Rod body end edge 32 defines an end opening 34 in the handle cavity 30. The handle 22 overlies a portion of the large end 27 of the rod body 12. The handle has an end edge 36 substantially coplanar with the end edge 32 of the rod body 12. The small variation from coplanar of the end edges 32,36 illustrated in FIGS. 3 and 4 is within the range of substantially coplanar.

The novel features of the invention include the cap 24 being readily and repetitively removable, such that access to the handle cavity 30 is provided when the cap 24 is removed, and the handle cavity 30 is sealed when the cap 24 is fitted. A vibratory module 38 is contained within handle cavity 30.

In one embodiment, shown in FIG. 3, vibratory module 38 includes an elongate mounting board 40, first and second battery contacts 42,44 extending from a top surface 46 of the mounting board 40, an electric motor 48 mounted to the top surface 46, and an eccentric weight 50 on a shaft 52 of the electric motor 48. Circuit conduits consisting of wires 54,56, 58,60 connect the battery 62 to a momentary, pushbutton switch 64 mounted in the fore grip 20.

In a second embodiment, shown in FIG. 4, vibratory module 38 includes an elongate printed circuit board 66, first and second battery fingers 68,70 extending from a top surface 72 of the circuit board 66, electric motor 48 mounted to the top surface 66, and eccentric weight 50 on shaft 52. Circuit conduits consist of circuit traces (not shown) connecting first battery finger 68 to wire 74, second battery finger 70 to wire 76, and wires 76 and 78 to momentary, pushbutton switch 64 mounted in the fore grip 20. Wire 78 is also connected to motor 48 as shown.

In both embodiments, the circuit conduits interconnecting the switch 64, electric motor 48 and battery 62 permit actuation of the electric motor when the switch 64 is depressed. Switch 64 is "momentary" in the sense that it is normally spring loaded to the open state, so that it switches motor 48 on only when pressure is being applied to the pushbutton.

Figure 5:
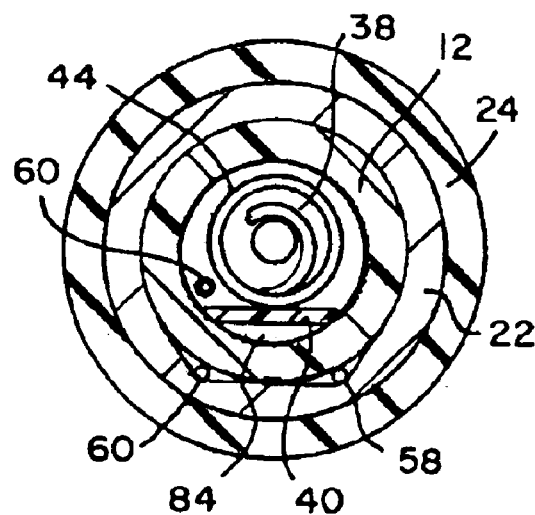
FIG. 5 is sectional view taken along lines 5—5 of FIG. 3.
Figure 6:
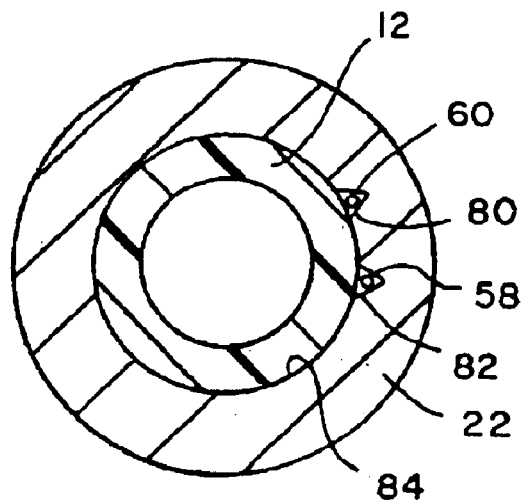
FIG. 6 is sectional view taken along lines 6—6 of FIG. 2, with the vibratory module omitted.

A key feature of the invention is that the circuit conduits are entirely interior of the fore grip 20, reel holder 18, and handle 22. In the embodiment of FIGS. 3, 5 and 6, walls 80 and 82 define grooves in a reel holder interior surface 84 to accommodate the circuit conduits 58,60. Circuit conduits 58,60 to the switch 64 are routed rearwardly over the end edges 32,36 of the handle 22 and rod body 12, then sandwiched between the handle 22 and rod body 12 as shown in FIG. 5, and then routed between the reel holder 18 and rod body 12 in the grooves defined by walls 80,82 as shown in FIG. 6, such that there are no apertures in the internal wall 28 of the rod body 12 necessary to accommodate circuit conduits. The material of handle 22 is sufficiently flexible, such as cork or rubber, to permit flexure over wires 58,60 as shown in FIG. 5. Motor 48 faces forwardly, so that wires 54,56 extend directly rearwardly. This embodiment is well adapted to installations in higher quality fishing rods, where the lack of any aperture in the rod body 12 avoids the possibility, however slight, that the rod body could be weakened by an aperture. This embodiment is essentially limited to fishing rods that are initially constructed to have a vibratory module installed.

In the embodiment of FIG. 4, the circuit conduits 76,78 are routed forwardly to an aperture (not shown) in the rod body internal wall 28 beneath or adjacent to switch 64. Again, all circuit conduits are internal to the structure. Motor 48 faces rearwardly, so that wires 74,78 extend directly forwardly. This embodiment may be readily installed as a retrofit to already constructed rods, where it is impossible to route the wires between the rod body 12 and handle 22, reel holder 18 and fore grip 20, because they are already permanently attached to rod body 12.

FIGS. 3 and 5, and FIG. 4, also show alternate embodiments of the vibratory module 38. In FIGS. 3 and 5, the motor 48 and battery contacts 42,44 are simply physically mounted to the mounting board 40, with the electrical circuit supplied by wires. A rounded, built up section 85 enables a tight fit between vibratory module 38 and internal wall 28 to enhance transmission of vibrations and reduction of noise. FIG. 4 shows a simpler construction, using a custom made printed circuit board 66 and minimal wires. A layer of adhesive tape 86 around battery 62 supplies a tight fit and efficient vibratory coupling between vibratory module 38 and internal wall 28, and is adjustable by winding more or less tape around the battery to achieve the desired tightness.

While the alternate circuit conduit embodiments are shown with particular alternate vibratory module alternate embodiments, it will be recognized that a flip-flopped configuration is also possible and may be more desirable. In other words, the printed circuit vibratory module of FIG. 4 could easily be used with the "no-aperture" circuit conduit embodiment of FIGS. 3 and 5, and vice versa.

Figure 7:
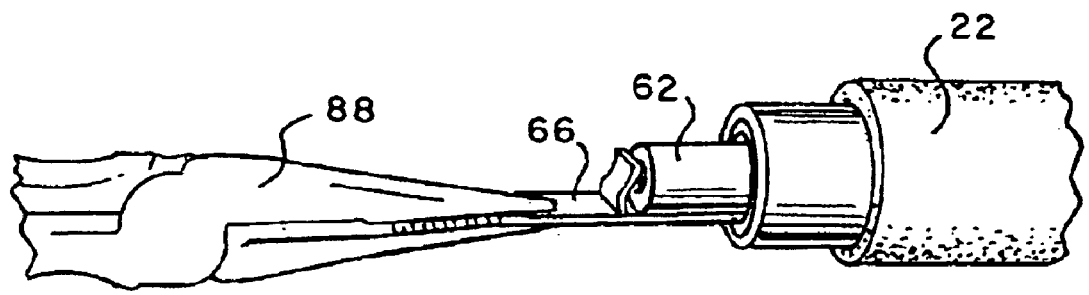
FIG. 7 is a perspective view showing removal of the vibratory module.

As shown in FIG. 7, the vibratory module can be removed from cavity 30 by grasping the end of the mounting board 40, or circuit board 66 as the case may be, with a pair of needle nose pliers 88. The wires within the cavity must have sufficient slack for the vibratory module to be pulled out enough to change the battery. Alternatively, access to the battery could be by an access port in the end or side of the handle covered by a removable plate, or portions of the vibratory module could fixed in place or the vibratory components formed integrally into specialized holding structure within the handle.

It is also apparent that the switch 64 could be located on either side of the reel holder 18, to accommodate left and right handed users, and spinning or casting reels. In addition, it may be preferable to locate the switch in the side of the reel holder to accommodate users who prefer to access the pushbutton with a different hand or part of the hand than that which would access the fore grip.

While the invention has been illustrated and described as embodied in a particular fishing rod, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

Whereas, the present invention has been described with respect to specific embodiments thereof, it will be understood that various changes and modifications will be suggested to one skilled in the art and it is intended to encompass such changes and modifications as fall within the scope of the appended claims.

What is claimed is:

1. A vibrating fishing rod, comprising: a vibratory module mounted within a handle cavity of the fishing rod the vibratory module being vibratory coupled to only a wall of the handle cavity, such that vibrations are only indirectly applied to a lure on the end of a line connected to the rod, with no direct connection of the vibratory module to the line:
   with the vibratory module frictionally engaged with the wall of the handle cavity, with no direct connection to the line from the vibratory module;
   with the rod including a tapered, hollow rod body having a large end, with an internal wall defining the handle cavity, and with the handle cavity being elongate and tapered to become smaller in a direction away from the large end;
   with a removable, open ended, cylindrical cap overlying an extreme end of the handle, such that access to the handle cavity is provided when the cap is removed, and the handle cavity is sealed when the cap is fitted: and the vibratory module being elongate and removable for servicing through the end of the handle;
   with a switch mounted in a fore grip located adjacent an inner end of a reel holder, and with circuit conduits interconnecting the switch and the vibratory module such that the switch controls the vibratory module.

2. A vibrating fishing rod comprising: a vibratory module mounted within a handle cavity of the fishing rod, the vibratory module being vibratory coupled to only a wall of the handle cavity, such that vibrations are only indirectly applied to a lure on the end of a line connected to the rod, with no direct connection of the vibratory module to the line:
   with the vibratory module frictionally engaged with the wall of the handle cavity, with no direct connection to the line from the vibratory module;
   with the rod including a tapered, hollow rod body having a large end, with an internal wall defining the handle cavity, and with the handle cavity being elongate and tapered to become smaller in a direction away from the large end;
   with a removable, open ended, cylindrical cap overlying an extreme end of the handle, such that access to the handle cavity is provided when the cap is removed, and the handle cavity is sealed when the cap is fitted; and the vibratory module being elongate and removable for servicing through the end of the handle;
   wherein the vibratory module includes an electric motor and eccentric weight connected for rotation by the electric motor, and with the electric motor and a battery being mounted to an elongate printed circuit board.

3. A vibrating fishing rod having a rod body, handle and a reel holder, comprising:
   a vibratory module mounted within a handle cavity of the fishing rod;
   with the vibratory module being accessible through an end opening defined by an end edge of the handle cavity;
   with a removable, open ended, cylindrical cap overlying an extreme end of the handle, such that access to the handle cavity is provided when the cap is removed, and the handle cavity is sealed when the cap is fitted;
   wherein the vibratory module includes an electric motor and eccentric weight connected for rotation by the electric motor, and with the electric motor and a battery being mounted to an elongate printed circuit board;

with a switch in the fore grip, and the electric motor being activated in response to actuation of the switch; and with circuit conduits to the switch routed rearwardly over the end edge of the cavity, then between the handle and rod body, and then between the reel holder and rod body, such that there are no apertures in the rod body for circuit conduits.

4. In a vibrating fishing rod of the type having a tapered, hollow rod body having a large end, with an internal wall defining an elongate, tapered handle cavity, and the rod body having an end edge defining an end opening in the handle cavity, with a handle overlying a portion of the large end of the rod body, the handle having an end edge substantially coplanar with the end edge of the rod body, a reel holder fitted over the rod body adjacent an inner end of the handle, and a fore grip fitted over the rod body adjacent an inner end of the reel holder, the improvement comprising: a removable, open ended, cylindrical cap overlying an extreme end of the handle, such that access to the handle cavity is provided when the cap is removed, and the handle cavity is sealed when the cap is fitted; a vibratory module within the handle cavity, the vibratory module including an elongate printed circuit board, first and second battery fingers extending from a top surface of the circuit board, an electric motor mounted to the top surface and an eccentric weight on a shaft of the electric motor; a momentary, pushbutton switch mounted in the fore grip; and circuit conduits interconnecting the switch, electric motor and battery to permit actuation of the electric motor when the switch is depressed, the circuit conduits being entirely interior of the fore grip, reel holder, and handle, and with walls defining at least one groove in a reel holder interior surface to accommodate a circuit conduit.

* * * * *